United States Patent [19]

Otsuki et al.

[11] Patent Number: 4,685,749
[45] Date of Patent: Aug. 11, 1987

[54] HYDRAULIC PRESSURE CONTROL DEVICE FOR USE IN VEHICLE ANTI-SKID BRAKING SYSTEM

[75] Inventors: Hiromi Otsuki; Ryoichi Matsuura; Hiroshi Fujinami; Shinichi Hori, all of Anjo; Yoshihisa Nomura, Toyota; Hiroyuki Oka, Susono, all of Japan

[73] Assignee: Nippondenso Co., Ltd., Kariya, Japan

[21] Appl. No.: 662,630

[22] Filed: Oct. 19, 1984

[30] Foreign Application Priority Data

Oct. 20, 1983 [JP] Japan .................................. 58-196640
Nov. 4, 1983 [JP] Japan .................................. 58-208027

[51] Int. Cl.$^4$ ............................................. B60T 8/40
[52] U.S. Cl. .................... 303/116; 303/119; 303/84 A; 137/112
[58] Field of Search ............... 303/116, 115, 119, 10, 303/68, 84 R, 84 A; 137/112, 113

[56] References Cited

U.S. PATENT DOCUMENTS

| | | | |
|---|---|---|---|
| 2,416,091 | 2/1947 | Fitch | 137/112 |
| 3,503,655 | 3/1970 | Heimler | 303/84 A |
| 3,941,427 | 3/1976 | Harries | 303/115 |
| 4,090,739 | 5/1978 | Ito | 303/10 |
| 4,116,495 | 9/1978 | Belart | 303/116 |
| 4,278,300 | 7/1981 | Backer | 303/115 |
| 4,404,803 | 9/1983 | Steffes | 303/13 |
| 4,453,782 | 6/1984 | Arikawa et al. | 303/116 |

FOREIGN PATENT DOCUMENTS

0104445 6/1982 Japan .................................. 303/116
0004658 1/1983 Japan .................................. 303/116

Primary Examiner—John W. Caldwell, Sr.
Assistant Examiner—Alvin Oberley
Attorney, Agent, or Firm—Cushman, Darby & Cushman

[57] ABSTRACT

A hydraulic pressure control device in a vehicle anti-skid braking system includes a brake master cylinder, a wheel brake actuating cylinder for braking a wheel in response to a fluid pressure from the brake master cylinder, a directional control valve actuatable in response to a signal from a control unit which detects a wheel condition such as wheel skidding, and a pressure control valve for disconnecting the brake master cylinder from a fluid pressure supply passage when a fluid pressure is supplied from the wheel brake actuating cylinder into a fluid pressure return passage connected to the pressure control valve when the directional control valve is actuated.

4 Claims, 8 Drawing Figures

HYDRAULIC PRESSURE CONTROL DEVICE FOR USE IN VEHICLE ANTI-SKID BRAKING SYSTEM

BACKGROUND OF THE INVENTION

The present invention relates generally to a vehicle anti-skid braking system, and more particularly to a hydraulic pressure control device with a kickback prevention capability in such a vehicle anti-skid braking system.

Various anti-skid braking systems for use in motor vehicles have been proposed and practiced for optimizing a hydraulic braking pressure under the control of a control unit to provide a more effective and safer braking action when the vehicle is braked in different road conditions. U.S. Pat. Nos. 4,090,739 and 4,278,300, for example, illustrate such anti-skid braking systems. However, prior anti-skid braking systems have proven unsatisfactory in that the brake pedal is subjected to a kickback during operation of the system.

SUMMARY OF THE INVENTION

It is an object of the present invention to provide a hydraulic pressure control device in vehicle anti-skid braking systems which is capable of preventing a brake pedal from being subjected to a kickback at the time of braking the vehicle.

According to the present invention, a hydraulic pressure control device in a vehicle anti-skid braking system includes a brake master cylinder, a wheel brake actuating cylinder, a master cylinder passage extending from the master cylinder, a fluid pressure supply passage connected to the wheel brake actuating cylinder, a control unit responsive to a wheel condition for generating a command signal, a directional control valve disposed in the fluid pressure supply passage and having at least first and second selective positions, the directional control valve being normally shifted to the first position to open the fluid pressure supply passage, a fluid pressure return passage connected to the directional control valve, and a pressure control valve connected between the master cylinder passage, the fluid pressure supply passage, and the fluid pressure return passage, the pressure control valve being normally shifted to connect the master cylinder passage and the fluid pressure supply passage. The directional control valve is actuatable in response to the command signal for closing the fluid pressure supply passage and connecting the wheel brake actuating cylinder to the fluid pressure return passage. The pressure control valve can be actuated to disconnect the fluid pressure supply passage from the master cylinder passage and connect the fluid pressure return passage to the fluid pressure supply passage in response to a fluid pressure supplied from the wheel brake actuating cylinder into the fluid pressure return passage when the directional control valve is actuated.

BRIEF DESCRIPTION OF THE DRAWINGS

The present invention will be described in detail by way of illustrative example with reference to the accompanying drawings, in which.

DETAILED DESCRIPTION

Figure 1:
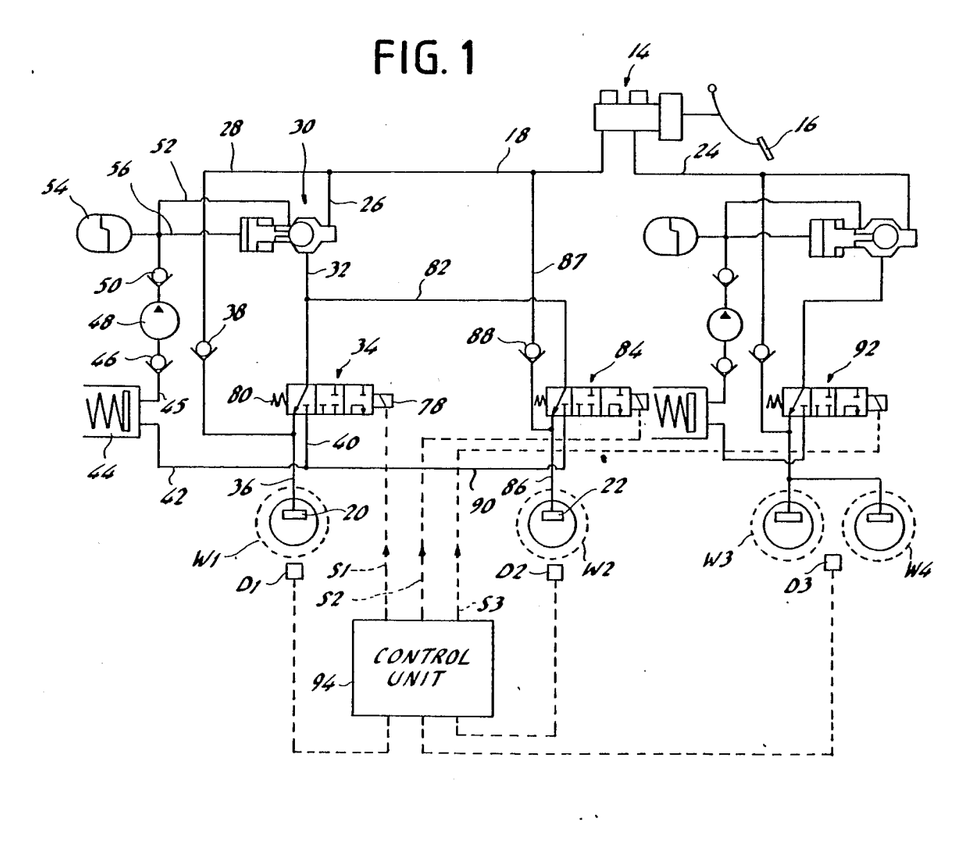
FIG. 1 is a schematic diagram of a hydraulic pressure control device according to the present invention in a vehicle anti-skid braking system.

As shown in FIG. 1, a hydraulic pressure control device in a vehicle anti-skid braking system includes a master cylinder 14 operatively coupled with a brake pedal 16. The master cylinder 14 has a first hydraulic pressure generating chamber (not shown) connected through a pipe 18 to brake actuating cylinders 20, 22 for front wheels W1, W2. The master cylinder 14 also has a second hydraulic pressure generating chamber (not shown) connected through a pipe 24 to brake actuating cylinders for rear wheels W3, W4. More specifically, the pipe 18 is branched into a supply pipe 26 and a return pipe 28. The supply pipe 26 is connected to an inlet port of a pressure control valve 30 having an outlet port connected to a supply pipe 32 coupled through a directional control valve 34 and a pipe 36 to the brake actuating cylinder 20.

The return pipe 28 is coupled through a check valve 38 and the pipe 36 to the brake actuating cylinder 20, the check valve 38 allowing the fluid to flow only in a direction from the brake actuating cylinder 20 to the master cylinder 14. A pipe 40 is connected to the directional control valve 34 and also connected through a pipe 42, a reservoir 44, a pipe 45, a check valve 46, a hydraulic pressure pump 48, a check valve 50, and a return pipe 52 to another inlet port of the pressure control valve 30. An accumulator 54 is coupled to the return pipe 52 from which there is branched a pipe 56 connected to a pilot port of the pressure control valve 30. The check valves 46, 50 are oriented such that they permit a fluid flow only in the direction from the reservoir 44 to the pressure control valve 30.

Figure 2:
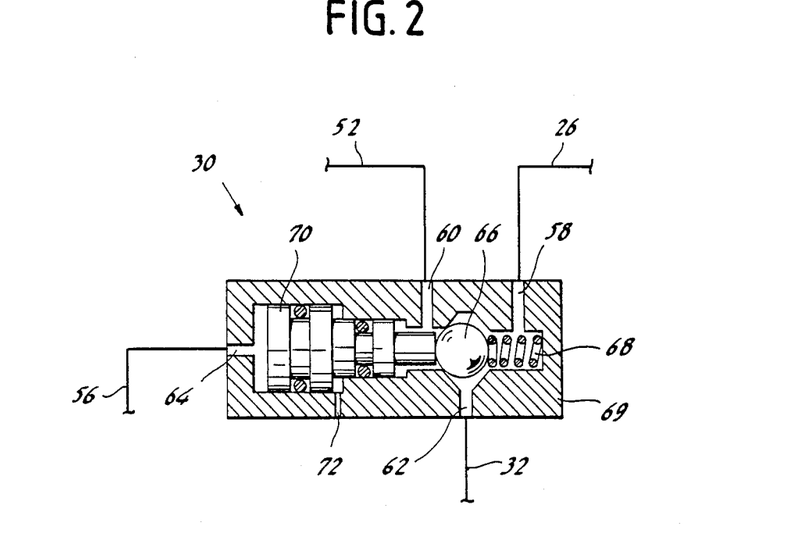
FIG. 2 is an enlarged longitudinal cross-sectional view of a pressure control valve in the hydraulic pressure control device shown in FIG. 1.

As shown in FIG. 2, the pressure control valve 30 includes a valve housing 69 having two inlet ports 58, 60, one outlet port 62, and a pilot port 64, which are connected to the pipes 26, 52, 32, and 56, respectively. The inlet ports 58, 60 are connected to the outlet port 62 through a passage in which there is movably disposed a directional control member 66 comprising a ball. When the ball 66 is moved to the left in FIG. 2 until it is seated on a seat, the passage leading to the inlet port 60 is closed while allowing fluid communication between the inlet port 58 and the outlet port 62. When the ball 66 is moved rightward in FIG. 2 against an opposite seat, the passage leading to the inlet port 58 is closed and the inlet and outlet ports 60, 62 are brought into mutual fluid communication. The ball 66 is normally urged by a compression coil spring 68 in a direction to allow fluid communication between the inlet and outlet ports 58, 62. A piston 70 is movably disposed in the valve housing 69 in a position opposite to the spring 68 across the ball 66. The piston 70 is movable under a fluid pressure introduced through the pilot port 64 in a direction to cause the inlet and outlet ports 60, 62 to communicate with each other against the bias of the spring 68. The valve housing 69 also has an air bleeder 72 communicating with a bore in which the piston 70 is disposed. Switching between the two selective passages through the pressure control valve 30 can be effected as desired and in a short period of time by selecting an appropriate pressure-bearing area of the piston 70.

Figure 3:
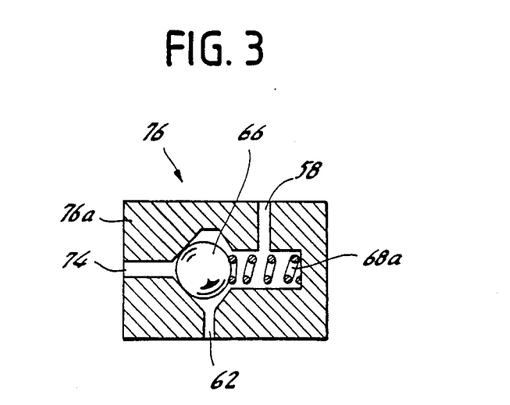
FIG. 3 is an enlarged longitudinal cross-sectional view of a pressure control valve according to another embodiment of the present invention.

FIG. 3 illustrates a pressure control valve 76 according to another embodiment, which can be used in place of the pressure control valve 30. The pressure control valve 76 has no pilot port and no piston, but has two inlet ports 58, 74 and a single outlet port 62 which are defined in a valve body 76a and selectively connectable by a movable ball 66 normally urged by a compression coil spring 68a in a direction to close the inlet port 74. The spring force produced by the compression coil spring 68a should be much smaller than that of the compression coil spring 68 of FIG. 2 since there is no piston acting on the ball 66 against the spring 68a. Instead of the ball 66, a rod-shaped directional control member may be used which has ends fittably engageable with respective valve seats in the valve housing.

Figure 5:
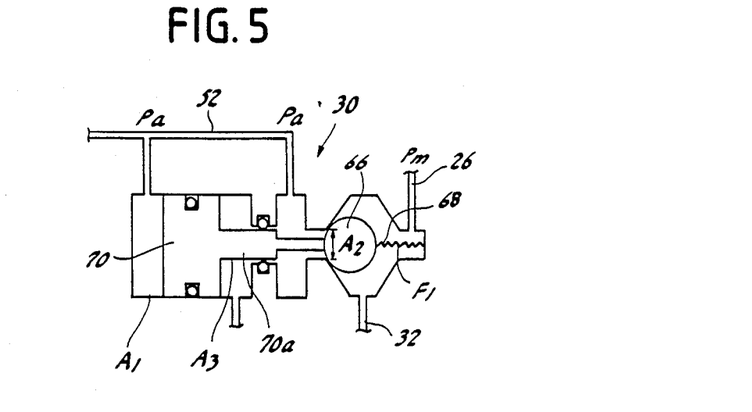
FIG. 5 is a schematic diagram explanatory of the pressure control valve illustrated in FIG. 2.

The pressure control valve 30 as shown in FIG. 5 is amenable, upon directional switching, to a mathematical analysis given by the following equations:

$$Pa(A1+A2-A3)=A2Pm+F1$$

Therefore, $$Pa=A2/(A1+A2-A3)Pm+F1/(A1+A2-A3) \quad (1)$$

where Pa is the fluid pressure in the return pipe 52, A1 is the pressure-bearing area of the piston 70, A2 is the pressure-bearing area of the ball 66 at the time the return passage 52 is closed, A3 is the cross-sectional area of a piston rod 70a of the piston 70, Pm is the fluid pressure applied by the master cylinder 14, and F1 is the resilient force from the compression coil spring 68. It is assumed in the foregoing equations that the distal end of the piston rod 70a is held in point-to-point contact with the ball 66.

Figure 6:
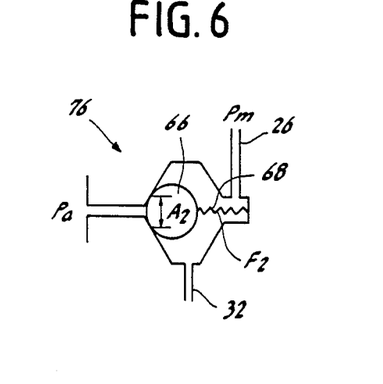
FIG. 6 is a schematic diagram explanatory of the pressure control valve illustrated in FIG. 3.

The pressure control valve 76 as illustrated in FIG. 6 is also amenable, upon directional switching, to a mathematical analysis expressed by the following equations:

$$Pa\,A2=Pm\,A2+F2$$

where F2 is the resilient force of the spring 68. Therefore, $$Pa=Pm+F2/A2$$

Since $F1 >> F2$, $$Pa \rightleftharpoons Pm\ ... \quad (2)$$

providing $F2 \rightleftharpoons 0$.

Figure 4:
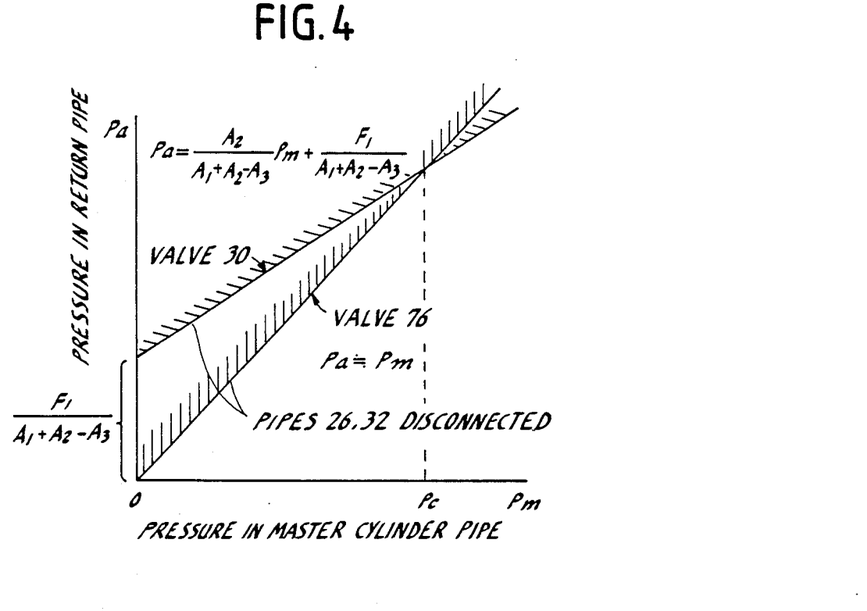
FIG. 4 is a graph showing characteristic curves of the pressure control valves of FIGS. 2 and 3.

FIG. 4 shows characteristic curves of the pressure control valves 30, 76. The hatched sides of the curves indicate regions in which the pipe 26 and the pipe 32 are not connected to each other. By changing the parameters A1, A2, A3, F1 of the pressure control valve 30, the valve 30 will have varied switching characteristics.

With the pressure control valve 76, its switching characteristics is indicated by Pa=Pm. Since the pressure in the pipe 26 and the pressure in the pipe 52 are substantially equal to each other upon directional switching, the pressure in the pipe 52 from the accumulator 54 will not be transmitted to the pipe 26. Therefore, the brake pedal is subjected to no shock or kickback when the pressure control valve is switched. By selecting F1/A1+A2−A3 to have a large value, the switching pressure is increased to the point where the pressure control valve will not be switched until the pressure Pa is sufficiently higher than the pressure Pm, so that the accumulator 54 can stored a sufficient amount of fluid.

The directional control valve 34 shown in FIG. 1 is a spring-biased solenoid-operated valve of the three-port and three-position type. When a high exciting current is passed through a solenoid 78 of the valve 34, the valve 34 is actuated to the leftmost or actuated position (FIG. 1) against the bias of a spring 80 of the valve 34. When a low exciting current is supplied to the solenoid 78, the valve 34 is positioned in an intermediate position. When no exciting current flows through the solenoid 78, the valve 34 is biased to the rightmost or normal position under the force of the spring 80.

To the brake actuating cylinder 22 of the other front wheel W2, there is connected a supply pipe 82 brandched from the supply pipe 32 through a directional control valve 84 identical in construction to the directional control valve 34 and a pipe 86. The brake actuating cylinder 22 is also connected to the master cylinder 22 through a return pipe 87 branched from the pipe 18, a check valve 88, and a pipe 86. A pipe 90 connected to the directional control valve 84 is connected through the pipe 42 to the reservoir 44.

The brake actuating cylinders of the rear wheels W3, W4 are connected to the pipe 24 through substantially the same arrangement as that for the front wheels W1, W2, except that the brake actuating cylinders are connected to a common directional control valve 92 identical to the directional control valves 34, 84. Of cource, two such directional control valves may be connected respectively to the brake actuating cylinders of the rear wheels W3, W4.

Wheel speed sensors D1, D2 are associated respectively with the front wheels W1, W2, and one speed sensor D3 is associated with the rear wheels W3, W4. The wheel speed sensors D1, D2, D3 generate pulse signals having frequencies proportional to the speeds of rotation of the wheels and apply such pulse signals to a control unit 94. The control unit 94 is responsive to the applied signals for computing wheel speeds, slip rates, decelerations to generate control signals S1, S2, S3. These control signals are supplied to the solenoids of the directional control valves 34, 84, 92. When the control signal is of a high level, the solenoid exciting current is of a high level. When the control signal is of an intermediate level, the solenoid exciting current is also of an intermediate level. When the control signal is of a low level, then no solenoid exciting current flows. Therefore, when the control signals S1, S2, S3 are of high, intermediate, and low levels, respectively, the directional control valves 34, 84, 92 are moved to the actuated position, the intermediate position, and the normal position, respectively. The control signals will be high in level when the fluid pressure in the brake actuating cylinders 20, 22 is to be reduced. The control signals will be intermediate in level when the fluid pressure in the brake actuating cylinders 20, 22 is to be maintained. The control signals will be low in level when the fluid pressure in the brake actuating cylinders 20, 22 is to be increased. The directional control valve 92 is similarly controlled for braking the rear wheels W3, W4. The control unit 94 of the above functions is of a simple conventional arrangement that could easily be achieved by those skilled in the art and hence will not be described in detail.

Operation of the hydraulic pressure control device thus contructed is as follows:

The driver now starts depressing the brake pedal 16 while the motor vehicle is running at a constant speed. At the time of starting braking the vehicle, the control unit 94 is responsive to detected signals from the wheel speed sensors for determining that each wheel has not yet reached a prescribed deceleration and slip rate. The control signals S1, S2, S3 are therefore low in level, and the directional control valves 34, 84, 92 are in the normal position. At this time, the pressure control valve 30 allows the supply pipes 26, 32 to communicate with each other. The fluid pressure from the master cylinder 14 is applied through the pipe 18, the pressure control valve 30, the supply pipes 32, 82, the directional control valves 34, 84, and the pipes 36, 86 to the brake actuating cylinders 20, 22 to thereby brake the front wheels W1, W2. The fluid is prevented by the check valves 38, 88 from flowing through the pipes 28, 87 into the pipes 36, 86.

The rear wheels W3, W4 are braked in the same manner.

When the braking fluid pressure is increased and the front wheels W1, W2 reach and are just about to exceed the predetermined deceleration and slip rate, the control signals S1, S2 go high in level to shift the directional control valves 34, 84 toward the actuated position in which the pipes 32, 36 and the pipes 82, 86 are disconnected, and the pipes 36, 40 and the pipes 86, 90 are connected. The braking fluid now flows from the brake actuating cylinders 20, 22 through the pipes 86, 90, 36, 40, 42 into the reservoir 44. The fluid pressure pump 48 starts operating when either the control signal S1 or S2 reaches the high level, so that the braking fluid is drawn by the pump 48 from the reservoir 44, pressurized, and then delivered through the check valve 50 and the return pipe 52 into the accumulator 54 and the pressure control valve 30. When the fluid is fed into the pipe 56, the ball 66 is pushed by the piston 70 against the force of the spring 68, thus connecting the pipes 52, 32 and disconnecting the pipe 26 from the pipe 32. The pressure energy of the braking fluid is stored in the accumulator 54. The same operation is carried out with respect to the rear wheels W3, W4. Therefore, the brake pedal 16 is not subjected to any kickback due to an unwanted pressure buildup in the pipe 18.

When the deceleration of the wheels W1, W2 restores a prescribed level and is about to be lower than the prescribed level, the control signals have the intermediate level to actuate the directional control valves 34, 84 into the intermediate or neutral position. The pipes 32 and 36, 40 and the pipes 82 and 86, 90 are then disconnected. The braking fluid pressure now remains maintained at a constant level. At this time, the pump 48 discharges the fluid from the reservoir 44 into the pipes 52, 56, but no kickback is produced as described above. The above operation holds true for the rear wheels W3, W4.

When there is no danger of skidding of the wheels W1, W2, the control signals S1, S2 go low in level to provide communication bewteen the pipes 32 and 36, 86 to allow the fluid pressure to go from the actuator 54 through the pipe 32 and the pipes 36, 86. The braking force on the front wheels W1, W2 is now increased. Likewise, the braking force on the rear wheels W3, W4 is also increased as the control signal S3 also goes low in level.

The above control operation is repeated until the motor vehicle reaches a desired speed or is stopped, whereupon the driver releases the brake pedal 16. The pressure in the portions of the return pipes 28, 87, which are closer than the check valves 38, 88 to the master cylinder 14, is lowered to permit the braking fluid to return from the cylinders 20, 22 through the pipes 36, 28, 18 and the pipes 86, 87, 18 back into the master cylinder 14. The braking fluid from the brake actuating cylinders of the rear wheels W3, W4 is also returned to the master cylinder 14 in the same manner.

The hydraulic pressure control device shown in FIG. 1 may be modified in various ways. For example, the rear wheels W3, W4 may be associated with their respective speed sensors which issue signals to the control unit 94. The front wheels W1, W2 may be controlled by a common directional control valve. Each brake actuating cylinder may be selectively supplied with higher and lower fluid pressures dependent on the skidding condition of the wheel.

Figure 7:
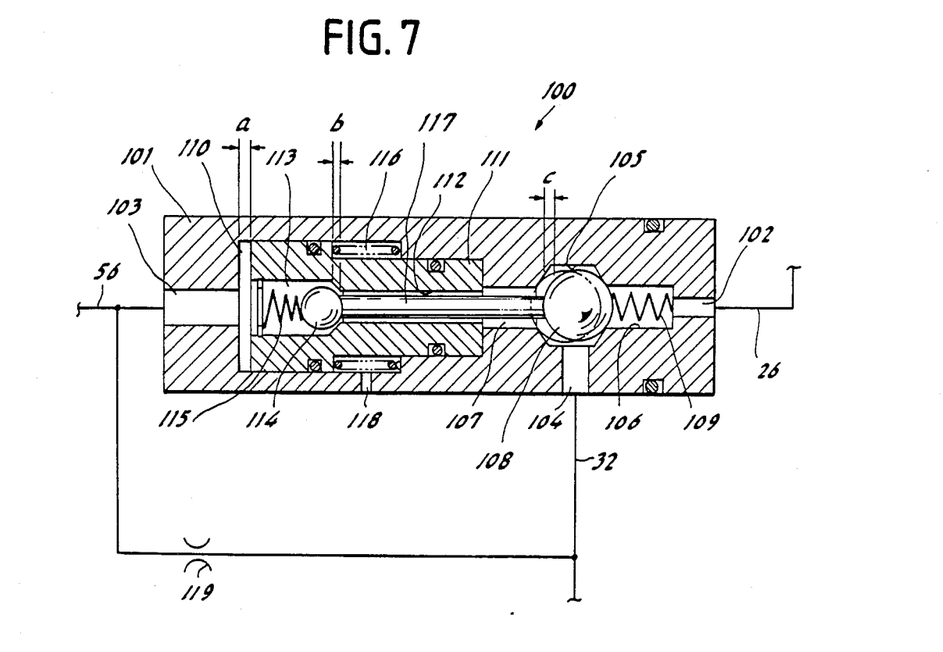
FIG. 7 is an enlarged longitudinal cross-sectional view of a pressure control valve according to still another embodiment of the present invention.
Figure 8:
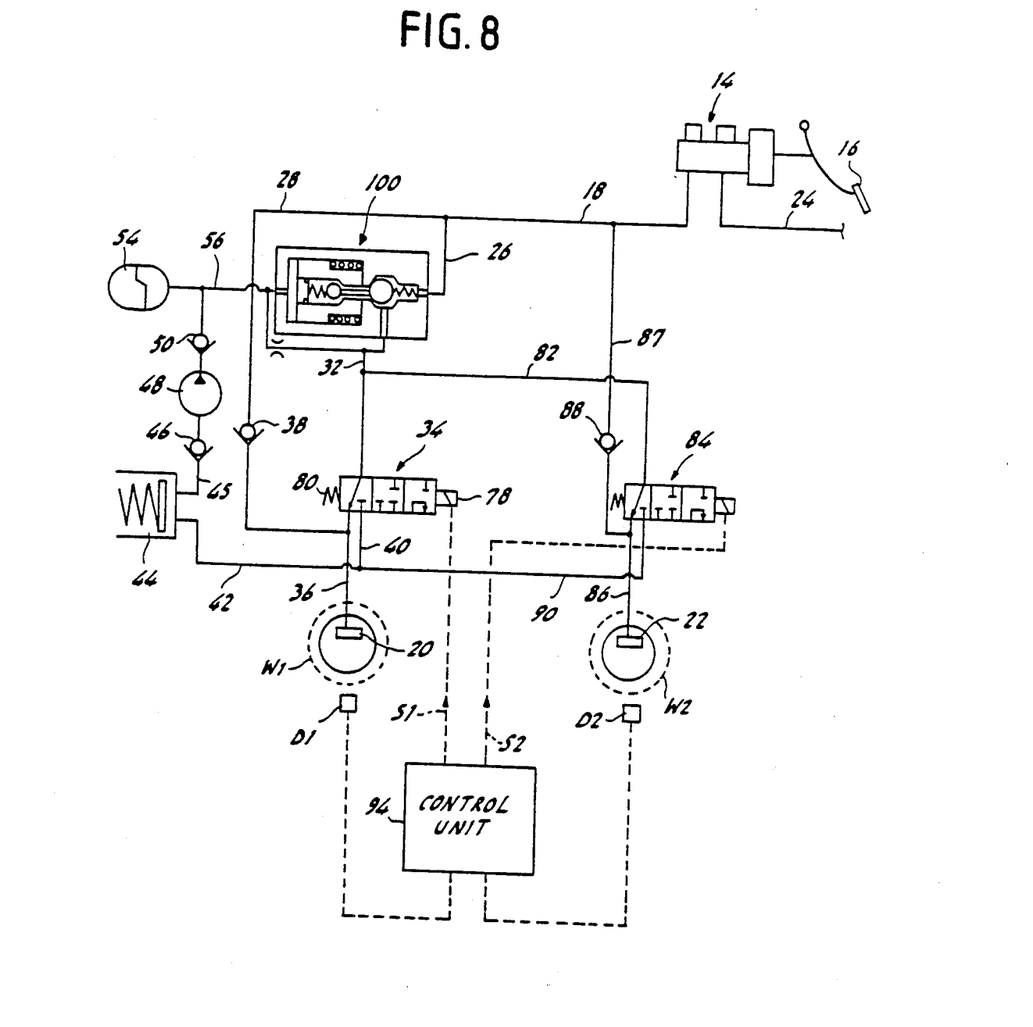
FIG. 8 is a schematic diagram of a hydraulic pressure control device incoporating the pressure control valve of FIG. 7 in a vehicle anti-skid braking system.

FIG. 7 illustrates a pressure control valve 100 according to a still further embodiment of the present invention, the pressure control valve 100 being incorporated in a hydraulic pressure control device shown in FIG. 8 which is basically identical to that illustrated in FIG. 1. The pressure control valve 100 has a valve housing 101 having an inlet port 102, an inlet port 103, and an outlet port 104 which are connected respectively to the pipes 26, 56, 32 (FIG. 8). The valve housing 101 has a first valve chamber 105 communicating with the inlet ports 102, 103 and the outlet port 104 through fluid passages. The fluid passage, denoted at 106, is connected to the inlet port 102, and the fluid passage, denoted at 107, is connected to the inlet port 103. The fluid passages 106, 107 open into the valve chamber 105 in opposite relation to each other, and define circimferential edges serving as valve seats between which a first valve body or ball 108 is movably disposed within the valve chamber 105. The ball 108 is normally urged to be seated against the valve seat on the side of the fluid passage 107 under the resiliency of a compression coil spring 109 disposed in the fluid passage 106. Therefore, the ball 108 normally allows fluid communication between the inlet port 102 and the outlet port 104 and prevents fluid communication between the inlet port 103 and the valve chamber 105.

The valve housing 101 has a stepped cylinder bore 110 in which a stepped piston 111 is slidably and hermetically fitted, the stepping piston 111 being reciprocably movable in a direction aligned with the centers of the valve seats in the valve chamber 105. The piston 111 has a central fluid passage 112 extending longitudinally therethrough and having a central axis aligned with the centers of the valve seats in the valve chamber 105. The fluid passage 112 includes a second valve chamber 113 opening toward the inlet port 103 and accommodating a second valve body or ball 114 movably therein. The ball 114 is normally urged by a compression coil spring 115 in a direction to be seated against a tapered valve seat in the valve chamber 113. The cylinder bore 110 accommodates therein a compression coil spring 116 for normally urging the piston 111 in a direction to be held against an end of the cylinder bore 110 adjacent to the inlet port 103. A rod 117 extends through the passage 112 and has ends engageable with the balls 108, 114 for positioning them relatively to each other. The valve housing 101 also has an air bleeder 118 communicating with the cylinder bore 110. The pipes 32, 56 are connected with each other through a restrictor 119 as a pressure relief means for the inlet port 103.

It is assumed that the piston 111 is movable in the cylinder bore 110 by a maximum interval a, the ball 114 is liftable off the tapered valve seat by a maximum interval b by means of the rod 117 when the ball 108 is seated on the valve seat in the valve chamber 105 on the side of the fluid passage 107, and the ball 108 is liftable by an interval c between the valve seats in the valve chamber 105. The components of the pressure control valve 100 are dimensioned to meet the following relationship:

$$a \geq b + c \qquad (3)$$

Furthermore, the springs 109, 115 are designed to meet the following relationship:

$$F1 \leq F2 \ldots \qquad (4)$$

where F1 is the force applied by the spring 109 at the time the ball 108 starts to be seated on the valve seat on the side of the fluid passage 106, and F2 is the force applied by the spring 115 at the time the ball 114 is lifted by the interval b.

The pressure control valve 100 operates as follows: The ball 108 is normally pressed by the spring 109 to close the fluid passage 107, while the fluid passage 112 is closed by the ball 114. When a braking fluid under pressure is supplied from the inlet port 103 into the cylinder bore 110, the piston 111 is moved in a direction toward the valve chamber 105 while at the same compressing the spring 116. The ball 114 also moves in the same direction, keeping the fluid passage 112 closed. The ball 114 causes the rod 117 to push the ball 108 to allow the fluid passage 107 to communicate with the valve chamber 105. Continued movement of the piston 111 causes the ball 108 to be seated on the valve seat on the side of the fluid passage 106, thus closing the inlet port 102. The ball 108 is now stopped. As the piston 111 continues to move, the ball 114 is now stopped by the rod 117 which is stopped by engagement with the ball 108. The ball 114 is then unseated off the tapered valve seat in the valve chamber 113, thus opening the fluid passage 112 to allow the braking fluid from the valve chamber 113 to flow through a clearance between the rod 117 and the inner peripheral surface of the fluid passage 112 and thence through the fluid passage 107, and the valve chamber 105 into the outlet port 104, from which the fluid is delivered into the pipe 32. Therefore, the inlet port 103 can be brought into communication with the outlet port 104 by first closing the inlet port 102 while communication with the the inlet port 103 is shut off by the ball 114, and then opening the fluid passage 112 to provide fluid communication between the inlet port 103 and the outlet port 104. With such an arrangement, when the pressure control valve 100 is shifted, no fluid pressure at all is introduced from the inlet port 103 into the inlet port 102. When the valve 100 subsequently restores its original position, the fluid pressure in the inlet port 103 is relieved through the restrictor 119 after the ball 114 has been closed, and then the piston 111 is moved to the left.

Various modifications and changes may be in the pressure control valve 10. For example, the rod 117 may be replaced with a rod integrally attached to one of the balls 108, 114. The balls 108, 114 may be replaced with poppet valves. The balls 108, 114 may be urged by the compression coil springs with intermediary members interposed therebetween, or may be urged by other suitable resilient means.

The pressure control valve 100 in the hydraulic pressure control device shown in FIG. 8 will operate in substantially the same manner as the pressure control valve 30 or 76 in the hydraulic pressure control device illustrated in FIG. 1. The major difference is that the fluid pressure flowing from the brake actuating cylinders 20, 22 when the directional control valves 34, 84 are shifted to the leftmost or actuated position is supplied into the pressure control valve 100 only through the pipe 56 connected to the inlet port 103.

Although certain preferred embodiments of the present invention have been shown and described in detail, it should be understood that various changes and modifications may be made therein without departing from the scope of the appended claims.

What is claimed is:

1. A hydraulic pressure control device in a vehicle anti-skid braking system, comprising:
   (a) a brake master cylinder;
   (b) a wheel brake actuating cylinder;
   (c) a master cylinder passage extending from said master cylinder;
   (d) a fluid pressure supply passage connected to said wheel brake actuating cylinder;
   (e) a control unit responsive to a wheel condition for generating a command signal;
   (f) directional control valve means disposed in said fluid pressure supply passage and having at least first and second selective positions, said directional control valve means being normally shifted to said first position to open said fluid pressure supply passage;
   (g) a fluid pressure return passage connected to said directional control valve means, said return passage including a reservoir and a pump; and
   (h) a pressure control valve connected between said master cylinder passage, said fluid pressure supply passage, and said fluid pressure return passage, said pressure control valve being normally shifted to connect said master cylinder passage and said fluid pressure supply passage, said directional control valve means being actuable in response to said command signal for closing said fluid pressure supply passage and connecting said wheel brake actuating cylinder to said fluid pressure return passage, so that said pressure control valve can be actuated to disconnect said fluid pressure supply passage from said master cylinder passage and connect said fluid pressure return passage to said fluid pressure supply passage in response to a fluid pressure supplied from said wheel brake actuating cylinder into said fluid pressure return passage when said directional control valve means is actuated,
   said pressure control valve having a valve housing, a first inlet port defined in said valve housing and connected to said master cylinder passage, a second inlet port defined in said valve housing and connected to said fluid pressure return passage, an outlet port defined in said valve housing and connected to said fluid pressure supply passage, and directional control means movably disposed in said valve housing for selectively providing fluid communication between said first inlet port and said outlet port and fluid communication between said second inlet port and said outlet port;

said valve housing further having a first valve chamber communicating with said first inlet port and said outlet port, said pressure control valve including a piston movably disposed in a bore in said valve housing and having a second valve chamber opening into said bore and an axial through passage opening into said second valve chamber, said bore communicating with said second inlet port, said directional control means comprising a first valve body movably disposed in said first valve chamber, a second valve body movably disposed in said second valve chamber, and a rod extending through said axial through passage and having ends engageable with said first and second valve bodies, and said pressure control valve further including a first spring disposed in said valve housing and acting on said first valve body for normally urging the same to connect said first inlet port to said outlet port, a second spring disposed in said piston and acting on said second valve body for normally urging the same to close said axial through passage out of communication with said second valve chamber, and a third spring disposed in said valve housing for normally urging said piston in a direction toward said second inlet port, said piston being movable away from said second inlet port in response to the fluid pressure in said fluid pressure return passage for causing said rod to displace said first valve body against the force of said first spring to close said first inlet port out of communication with said outlet port and then for causing said rod to displace said second valve body against the force of said second spring to open said axial through passage into communication with said second valve chamber.

2. A fluid pressure control device according to claim 1, wherein each of said first and second valve bodies comprises a ball.

3. A hydraulic pressure control device in an anti-skid braking system of a vehicle, comprising:
   (a) a master cylinder for generating a high pressure braking fluid on the braking operation of said vehicle and then for supplying the generated high pressure braking fluid to a brake supply passage;
   (b) a wheel brake cylinder for applying a braking force to a wheel of said vehicle;
   (c) control valve means disposed between said master cylinder and said wheel brake cylinder for switching between at least two modes, one of which increasing the braking force applied to said wheel by said wheel brake cylinder and the other of which decreasing the braking force by discharging the high pressure braking fluid to be applied to said wheel brake cylinder;
   (d) a control unit for selectively applying a control signal indicative of said pressure-increasing mode and a control signal indicative of said pressure-decreasing mode to said control valve means in accordance with the variations of skid condition;
   (e) a reservoir for receiving the braking fluid discharged at the time of said pressure-decreasing mode of said control valve means;
   (f) a fluid pump for pumping the braking fluid in said reservoir and returning the same to a fluid return passage; and
   (g) a switching valve disposed at a connection point between said fluid return passage and said brake supply passage for establishing communication between an outlet port coupled to said control valve means and said brake supply passage and establishing communication between said outlet port and said fluid return passage, said switching valve comprising a valve housing having a valve chamber in which a first valve seat coupled to the side of said master cylinder and a second valve seat coupled to the side of said fluid return passage are in opposite relation to each other and having a fluid passage for establishing communication between said valve chamber and said outlet port and having a first inlet port for coupling said first valve seat to said brake supply passage and a second inlet port for coupling said second valve seat to said fluid return passage, a valve body disposed between said first and second valve seats, and means for normally bringing said valve body into contact with said second valve seat by means of a spring and for bringing said valve body into contact with said first valve seat against the urging force of said spring in response to the increase of the first fluid pressure in said fluid return passage, said switching valve further including a piston movably disposed in a bore in said valve housing, said bore communicating with said fluid return passage, said piston causing said valve body to be movable against the bias of said spring in response to the increase of the fluid pressure in said fluid return passage so that said first valve seat is set to the closed condition and said second valve seat is set to the opened condition to provide communication between said second inlet port and said outlet port.

4. A hydraulic pressure control device in an anti-skid braking system of a vehicle, comprising:
   (a) a master cylinder for generating a high pressure braking fluid on the braking operation of said vehicle and then for supplying the generated high pressure braking fluid to a brake supply passage;
   (b) a wheel brake cylinder for applying a braking force to a wheel of said vehicle;
   (c) control valve means disposed between said master cylinder and said wheel brake cylinder for switching between at least two modes, one of which increasing the braking force applied to said wheel by said wheel brake cylinder and the other of which decreasing the braking force by discharging the high pressure braking fluid to be applied to said wheel brake cylinder;
   (d) a control unit for selectively applying a control signal indicative of said pressure-increasing mode and a control signal indicative of said pressure-decreasing mode to said control valve means in accordance with the variation of skid condition;
   (e) a reservoir for receiving the braking fluid discharged at the time of said pressure-decreasing mode of said control valve means;
   (f) a fluid pump for pumping the braking fluid in said reservoir and returning the same to a fluid return passage; and (g) a switching valve disposed at a connection point between said fluid return passage and said brake supply passage for establishing communication between an outlet port coupled to said control valve means and said brake supply passage and establishing communication between said outlet port and said fluid return passage, said switching valve comprising a valve housing having a valve chamber in which a first valve seat coupled to the side of said master cylinder and a second valve seat coupled to the side of said fluid return passage are in opposite relation to each other and having a fluid passage for establishing communication between said valve chamber and said outlet port and having a first inlet port for coupling said first valve seat to said brake supply passage and a second inlet port for coupling said second valve seat to said fluid return passage, a valve body disposed between said first and second valve seats, and means for normally bringing said valve body into contact with said second valve seat by means of a spring and for bringing said valve body into contact with said first valve seat against the urging force of said spring in response to the increase of the first fluid pressure in said fluid return passage, said switching valve further including a piston movably disposed in a bore in said valve housing, said bore communicating with said fluid return passage through said second inlet port, said piston having a passage for coupling said second inlet port to said second valve seat and said coupling passage having a rod therein, one end of said rod being lockingly coupled to said piston and the other end thereof coming into contact with said valve body, said rod being movably operatively associated with the movement of said piston performed in response to the increase of the fluid pressure in said fluid return passage so that said valve body is moved against the bias of said spring to set said first valve seat to the closed condition and set said second valve seat to the opened condition with provided communication between said second inlet port and said outlet port.

* * * * *